United States Patent
Fan

(10) Patent No.: US 10,284,372 B2
(45) Date of Patent: May 7, 2019

(54) METHOD AND SYSTEM FOR SECURE MANAGEMENT OF COMPUTER APPLICATIONS

(71) Applicant: Alibaba Group Holding Limited, George Town (KY)

(72) Inventor: Jianwei Fan, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/863,123

(22) Filed: Sep. 23, 2015

(65) Prior Publication Data

US 2016/0094347 A1     Mar. 31, 2016

(30) Foreign Application Priority Data

Sep. 30, 2014   (CN) .......................... 2014 1 0520339

(51) Int. Cl.
  *H04L 9/32*     (2006.01)
  *H04L 29/06*    (2006.01)
  *H04L 9/08*     (2006.01)

(52) U.S. Cl.
  CPC .......... *H04L 9/3242* (2013.01); *H04L 9/0866* (2013.01); *H04L 9/3239* (2013.01); *H04L 63/0428* (2013.01); *H04L 2209/24* (2013.01)

(58) Field of Classification Search
  CPC ............ H04L 9/00; H04L 9/32–9/3297; H04L 63/04–63/0492; H04L 63/08–63/0892; H04L 63/10; H04L 63/1408; H04L 63/1416; H04L 67/12; H04L 9/3242; H04L 9/3239; H04L 9/0866; H04L 63/0428; H04L 2209/24; H04L 29/06; G06F 15/16–15/18; G06F 21/00; G06F 21/30–21/46; G06F 21/60

USPC .......... 713/168, 161, 170, 165; 726/2, 6, 30
See application file for complete search history.

(56) References Cited

U.S. PATENT DOCUMENTS

| | | |
|---|---|---|
| 6,263,081 B1 | 7/2001 | Miyaji et al. |
| 7,069,591 B1 | 6/2006 | Weicher |
| 2002/0016922 A1 | 2/2002 | Richards et al. |
| 2003/0188175 A1* | 10/2003 | Volk ........................ G06F 21/10 713/191 |
| 2006/0200857 A1 | 9/2006 | Yokota |
| 2009/0202068 A1 | 8/2009 | Qureshi et al. |
| 2009/0262926 A1* | 10/2009 | Kabra ..................... G06F 21/72 380/44 |
| 2011/0002459 A1* | 1/2011 | Kim ...................... H04L 9/3242 380/28 |

(Continued)

FOREIGN PATENT DOCUMENTS

| | | |
|---|---|---|
| CN | 101894222 | 11/2010 |
| CN | 103200566 | 7/2013 |
| CN | 103716330 | 4/2014 |

*Primary Examiner* — Ashokkumar B Patel
*Assistant Examiner* — Quazi Farooqui
(74) *Attorney, Agent, or Firm* — Van Pelt, Yi & James LLP

(57) ABSTRACT

Processing information is disclosed including receiving an application retrieval request sent by a terminal, the application retrieval request including identifying information of the terminal, generating, based on a preset key generation technique, an encryption key based on the identifying information included in the application retrieval request, encrypting, based on the encryption key and a preset encryption technique, designated data in an application to obtain an encrypted application, and sending the encrypted application to the terminal.

27 Claims, 9 Drawing Sheets

(56) References Cited

U.S. PATENT DOCUMENTS

| | | |
|---|---|---|
| 2014/0041000 A1 | 2/2014 | Rolfe |
| 2014/0143550 A1 | 5/2014 | Ganong et al. |
| 2014/0237255 A1 | 8/2014 | Martin et al. |
| 2014/0281512 A1* | 9/2014 | Arasu .................. G06F 21/602 713/165 |

* cited by examiner

METHOD AND SYSTEM FOR SECURE MANAGEMENT OF COMPUTER APPLICATIONS

CROSS REFERENCE TO OTHER APPLICATIONS

This application claims priority to People's Republic of China Patent Application No. 201410520339.4 entitled AN INFORMATION PROCESSING METHOD AND DEVICE, filed Sep. 30, 2014 which is incorporated herein by reference for all purposes.

FIELD OF THE INVENTION

The present application relates to a method and system for secure management of computer applications.

BACKGROUND OF THE INVENTION

With the rapid development of computer technology, the need for protecting digital intellectual property is increasing.

Various applications typically use a licensing method to protect their digital intellectual property to prevent users from using the applications on unauthorized equipment, i.e., the equipment is only permitted to run an application when the application has successfully validated the license of the equipment on which the application is located. For example, for an application developed using the Java language, in the source code relating to the application, a segment of specified code is used to validate the license of the equipment on which the application is located, and determines whether the equipment is permitted to run the application based on the validation results. If the license to run the application is valid, the equipment is allowed to run the application; otherwise, the equipment is denied permission to run the application.

However, for applications that use interpreted languages such as Java, because attackers are able to perform a decompilation analysis on an application to obtain source code for the application, and thereby maliciously modify code in the source code used for determining the validity of the license, for example, by modifying the logic of the segment of code so that if the license is determined to be invalid, the equipment is still permitted to run the application. In this scenario, unauthorized equipment can run the application normally. Therefore, a licensing approach is unable to prevent attackers from executing the application normally on unauthorized equipment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
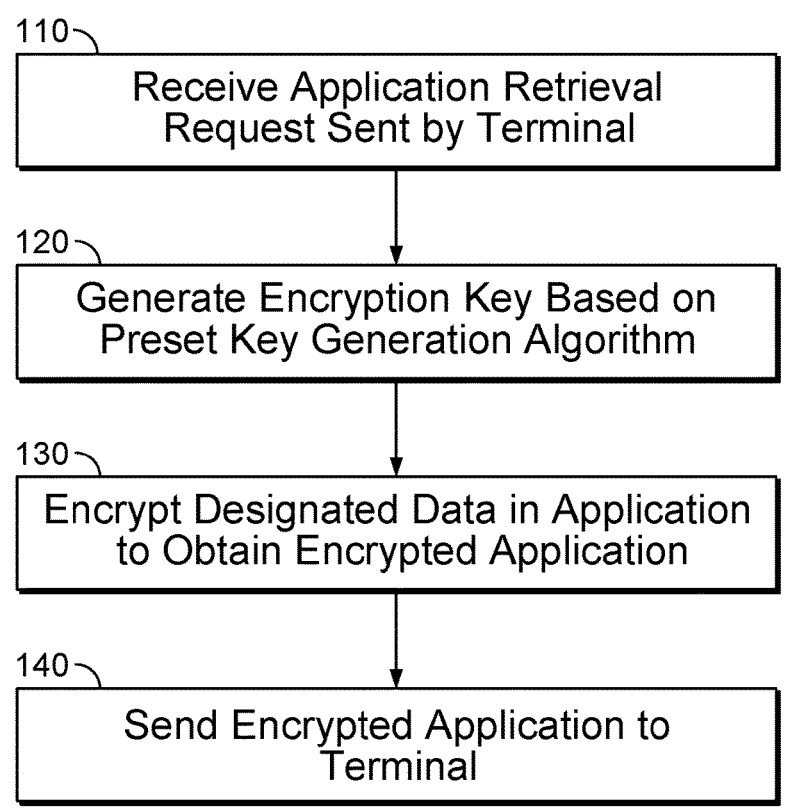
FIG. 1 is a flowchart illustrating an embodiment of a process for secure management of computer applications.

FIG. 1 is a flowchart illustrating an embodiment of a process for secure management of computer applications. In some embodiments, the process 100 is implemented by a server such as 810 of FIG. 8 and comprises:

In 110, the server receives an application retrieval request sent by a terminal, the application retrieval request including identifying information of the terminal.

In some embodiments, the server is a server of an application provider, and the terminal is a personal computer (PC), mobile phone, tablet, etc.

The server provides the terminal with an interface to retrieve the application. For example, the interface corresponds to an application programming interface (API). When the terminal retrieves the application from the server, the terminal can send an application retrieval request including identifying information of the terminal to the server using the interface. In some embodiments, content and format of the application retrieval request can be defined in advance for the interface, so that the server is able to correctly recognize received application retrieval requests and perform post-processing.

The identifying information of the terminal can uniquely identify the terminal. For example, the identifying information can be an international mobile equipment identity (IMEI) of a mobile telephone, where each IMEI uniquely identifies a mobile telephone or other mobile equipment. For a personal computer (PC), the identifying information can be the PC's media access control (MAC) address, i.e., the physical address of the network information card (NIC) of the PC. Each MAC address uniquely identifies a PC or other physical equipment. In some embodiments, the identifying information of the terminal identifies at least two terminals. For example, the identifying information of mobile telephones also includes a mobile telephone production lot serial number where the production lot serial number identifies all mobile telephones produced in the same production lot.

In 120, the server generates, based on the identifying information, an encryption key based on a preset key generation technique.

In some embodiments, the key generation technique can be built into the application in advance (e.g., as a part of the program code), and based on the identifying information included in the application retrieval request, the server can use the key generation technique built into the application to generate the encryption key. For example, the server retrieves the key generation technique built into the application in advance from the application. In some embodiments, the server, if the key generation technique is well known, retrieves the key generation technique only by its name, and performs the named key generation technique; otherwise, the application provides the key generation technique to the server.

In another example, instead of building a key generation technique into the application, multiple key generation techniques can be stored on the server in advance. When the server receives the application retrieval request sent by the terminal, the application retrieval request including the identifying information of the terminal, the server can arbitrarily select one of the various key generation techniques stored in advance, and generate an encryption key based on the identifying information of the terminal. The generating of the encryption key is based on the selected key generation technique, and the server can build the selected key generation technique into the application. In some embodiments, the key generation technique is included in the application data and stored at a pre-set storage location in the application data. For example, the key generation technique can be written into a resource file of an application.

In an open key generation technique, the resource file of the application includes a name or identification (ID) of the key generation technique. The terminal device obtains the name or ID of the key generation technique from the resource file of the application, and then performs the key generation technique based on the name or ID of the key generation technique.

In a private key generation technique, a library file including the key generation technique can be packed into the application, and the resource file can provide information, e.g. name or ID, to locate the library file. In a terminal device, the terminal device can obtain the information of the library file from the resource file of the application,to locate the library file, and call the key generation technique from the library file.

In 130, the server encrypts designated data in the application to obtain an encrypted application based on the encryption key and the preset encryption technique. To obtain the encrypted application, only a portion or all the data is encrypted. The encrypted data includes key data for the application. In other words, without the key data, the application would not execute normally.

Similarly, an encryption technique and a corresponding decryption technique (the decryption technique to be used by the terminal for subsequent decryption of the encrypted designated data in the application) can be built into the application in advance, so the server can use the encryption key generated in operation 120 and the encryption technique built into the application to encrypt the designated data in the application. For example, the server can retrieve the encryption technique built into the application in advance directly from this application based on, for example, the open key generation technique or the private key generation technique, discussed above.

In another example, instead of building an encryption technique into the application, multiple encryption techniques can be stored on the server in advance, in which case, after the server has generated an encryption key, the server can arbitrarily select an encryption technique from the various stored encryption techniques, and then based on the generated encryption key and the selected encryption technique, encrypt the designated data in the application. In some embodiments, the server also builds the decryption technique corresponding to the selected encryption technique into the application (e.g., the open key generation technique or the private key generation technique, discussed above), so that the terminal can subsequently decrypt the encrypted designated data in the application based on the decryption technique.

For example, the encryption technique can be a technique such as a Data Encryption Standard (DES), a Triple Data Encryption Standard (3DES), an International Data Encryption Technique (IDEA), a Secure Hash Technique 1 (SHA-1), SHA-256, SHA-512, a Message Digest Technique-5 (MD5), an Advanced Encryption Standard (AES), etc. The technique can also be an encryption technique developed independently by the application provider's developer. The present application does not limit the encryption technique that is preset on the server.

The designated data in the application can be important data (also referred to as key data) that can affect the accuracy of the operating results of the application, or any data that can affect the system's operation. The designation of "key data" refers to data that is very important to the application. In other words, without the key data, the application could not run properly. For example, the key data can be a data table in a database of an application, a SharedPreferences EXtensible Markup Language (XML) file for an Android device, etc.

In 140, the server sends the encrypted application to the terminal.

After the terminal obtains the application, if the application is received from the server after the terminal has sent an application retrieval request (the application retrieval request including the identifying information of the terminal) to the server, the designated data in the application is data that has been encrypted based on the identifying information of the terminal. Thus, the terminal can generate a corresponding decryption key based on the key generation technique built into the application and the terminal's identifying information, and decrypt the encrypted designated data in the application based on the decryption key and the decryption technique built into the terminal so that the encrypted data can be used to ensure correct operation of the application. At this point, the terminal becomes an authorized terminal. As an aspect, if the application was not received from the server as the result of the terminal sending an application retrieval request to the server (for example, if the application was obtained by copying the application from another terminal), then the designated data in the application would not be encrypted based on the identifying information of the terminal, and the terminal would be unable to correctly decrypt the encrypted designated data in the application, and therefore would be unable to run the application correctly. At this point, the terminal can be referred to as an unauthorized terminal.

Using the above process 100, even if an unauthorized terminal copies the application from an authorized terminal, because key data in the application sent by the server to the authorized terminal is already encrypted, and the unauthorized terminal is unable to generate the correct decryption key based on the unauthorized terminal's identifying information (the correct decryption key can only be generated based on the identifying information of the authorized terminal), the unauthorized terminal is thus unable to correctly decrypt the encrypted key data in the application. Therefore, attackers can be prevented from using the application normally on unauthorized terminals.

Additionally, because the identifying information of the terminal can also be used to identify at least two terminals, in this situation, if the application returned by the server is encrypted based on the at least two terminals' identifying information, for the application, all terminals identified by the at least two terminals' identifying information are authorized terminals, i.e., all of these terminals are able to generate a correct decryption key based on the at least two terminals' identifying information and decrypt the encrypted designated data in the application, and the application can therefore operate normally on each of these terminals.

For example, assuming that the terminals are mobile telephones, the mobile telephone identifying information could be a production lot serial number. The server generates an encryption key based on the production lot serial number of the mobile telephones, and encrypts, based on the encryption key and a preset encryption technique, the designated data in the application to obtain an encrypted application. Thus, all mobile telephones having the production lot serial number can generate a correct decryption key and then are capable of decrypting the encrypted application, whereupon the application can be run normally.

In some embodiments, after the server sends the encrypted application to the terminal, when the terminal is to decrypt the encrypted designated data in this application, instead of generating the decryption key independently, the terminal can send a key retrieval request including the identifying information of the terminal to the server to retrieve the decryption key. After the server receives the key retrieval request sent by the terminal, based on the identifying information of the terminal included in the key retrieval request, the server can generate a decryption key based on the preset key generation technique, and then send the decryption key to the terminal. In this situation, because the process of generating the decryption key is performed on the server rather than on the individual terminals, the likelihood that the key generation technique is to be leaked is therefore reduced, further strengthening security.

Furthermore, in operation 120 above, the technique by which the server generates the encryption key can be as follows: the server determines a hash value of the identifying information of the terminal included in the application retrieval request to serve as a key seed, and generates, based on the key seed, an encryption key based on the preset key generation technique.

For example, the server determines whether the number of digits of the key seed is the same as the number of digits of an adaptation key of the key generation technique; if the number of digits of the key seed is the same as the number of digits of the adaptation key, then the key seed is determined to be the generated encryption key; and if the number of digits of the key seed is not the same as the number of digits of the adaptation key, then the key seed is converted into a key seed having the same number of digits as the adaptation key of the key generation technique, and the converted key seed is determined to be the generated encryption key. The adaptation key is well understood by one of ordinary skill in the art and will not be further discussed for conciseness.

In some embodiments, a conversion technique for converting the key seed into a key seed having the same number of digits as the adaptation key can be as follows: a key seed having a number of digits that is less than a number of digits of an adaptation key is expanded, and a key seed having a number of digits that is greater than a number of digits of an adaptation key is truncated, so that the number of digits of the expanded key seed or the truncated key seed is the same as the number of digits of the adaptation key. For example, when the number of digits of the key seed is less than the number of digits of the adaptation key of the key generation technique, a hash value of the key seed is determined, a series obtained by combining the key seed and the hash value of the key seed is re-determined to be the key seed, and a determination is made as to whether the number of digits of the newly determined key seed is the same as the number of digits of the adaptation key. This process is repeated until the number of digits of the determined key seed is the same as the number of digits of the adaptation key. When the number of digits of the key seed is greater than the number of digits of the adaptation key of the key generation technique, the key seed is truncated to the number of digits of the key seed, and the truncated key seed is determined to be the generated encryption key, as described in FIG. 2.

Figure 2:
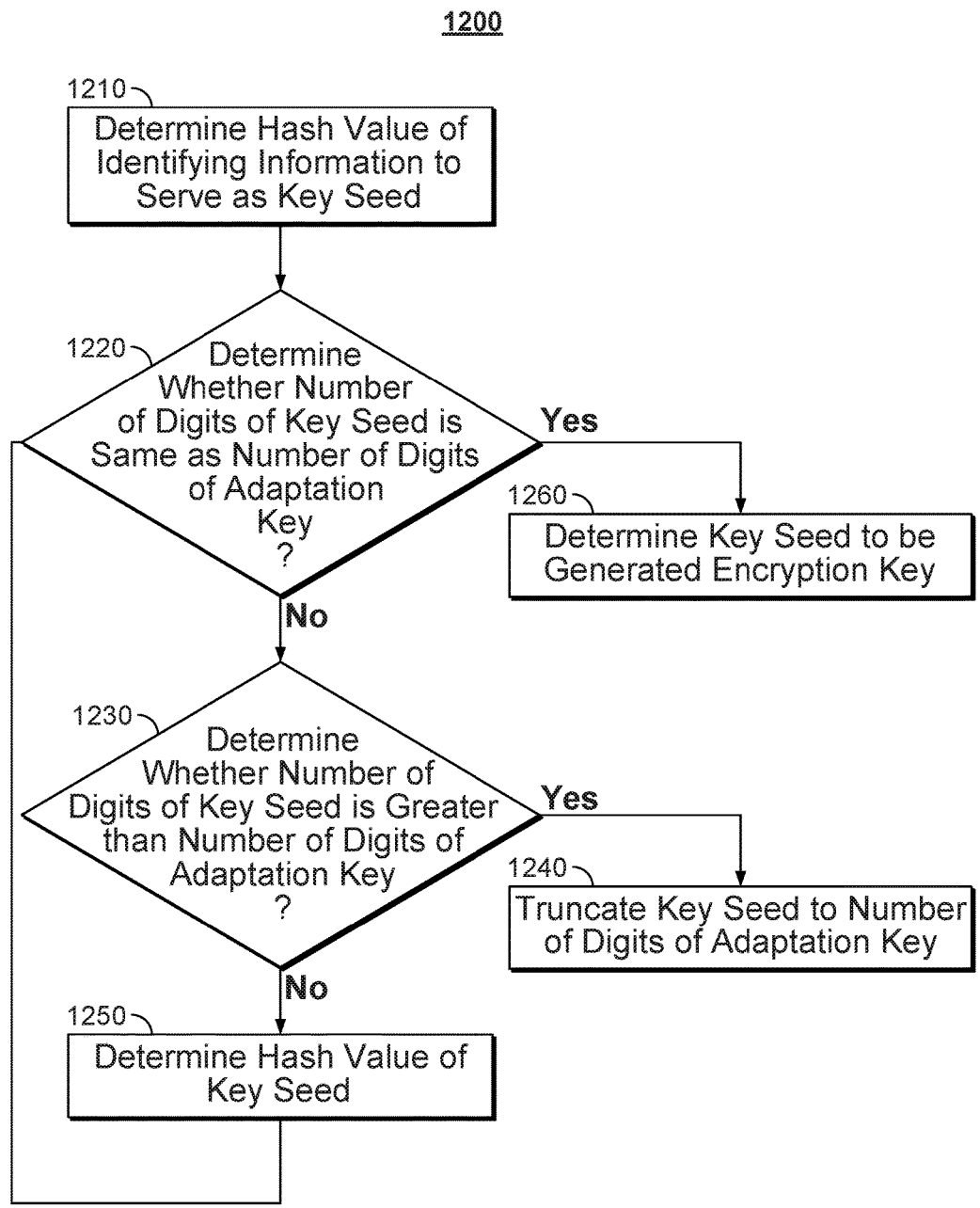
FIG. 2 is a flowchart illustrating an embodiment of a process for generating an encryption key.

FIG. 2 is a flowchart illustrating an embodiment of a process for generating an encryption key. In some embodiments, process 1200 is an implementation of operation 120 of FIG. 1 and comprises:

In 1210, the server determines a hash value of identifying information of a terminal included in an application retrieval request to serve as a key seed.

For example, a one-way hash technique (such as MD5) is used to determine the hash value of the identifying information of the terminal.

In 1220, the server determines whether a number of digits of the key seed is the same as a number of digits of an adaptation key of a key generation technique. If the number of digits is the same as the number of digits of the adaptation key, control is passed to operation 1260; otherwise, control is passed to operation 1230.

In 1230, the server determines whether the number of digits of the key seed is greater than the number of digits of the adaptation key of the key generation technique. If the number of digits of the key seed is greater than the number of digits of the adaptation key, control is passed to operation 1240; otherwise, control is passed to operation 1250.

In 1240, the server truncates the key seed to the number of digits of the adaptation key, and determines the truncated key seed to be the generated encryption key.

The truncation technique is not limited. In some embodiments, one feasible truncation technique is as follows: from the highest digit of the key seed to the lowest, the number of digits of the adaptation key is selected in succession, and the selected portion is determined to be the generated encryption key, i.e., the portion of the key seed that is not selected is truncated.

In 1250, the server determines the hash value of the key seed, and re-determines a series obtained based on a combination of the key seed and the hash value of the key seed to be a new key seed, and control passes to operation 1220.

The combining technique is not limited. In some embodiments, one feasible combining technique is as follows: the key seed and the hash value of this key seed are connected end to end to obtain a series; the number of digits of the series is the sum of the number of digits of the key seed and the number of digits of the hash value of the key seed; then, the obtained series is re-determined to be the key seed.

In 1260, the server determines the key seed to be the generated encryption key.

Furthermore, in some embodiments, for applications that rely on an underlying data source (the underlying data source typically being a data table in the database) to operate correctly, only encryption of the data table in the database is needed to prevent attackers from using the application normally on unauthorized equipment. Therefore, in operation 130 of FIG. 1, the designated data of the application comprises: a data table in a database of the application.

The following description uses an example of a game application. Many game applications use databases to set and manage various numerical values in the game. These numerical values can relate to life values, attack values, defense values, and supply and equipment identifiers (IDs) of game characters including player characters (or game characters), or non-player control characters (NPCs). When a player runs the application, the application reads various data tables from the database, loads various initialization data, and in the course of the player's play of the game, based on activities of the player's character, performs real-time operations (create, delete, read, and write operations) with respect to the various data tables.

Suppose that game application A is on the server. A certain data table in the database of game application A logs the relevant numerical values (life values, attack values, and defense values) of the three game characters 1-3. This data table corresponds to the designated data (i.e., the data to be encrypted) of game application A, as shown in Table 1 below.

TABLE 1

|  | Life value (binary) | Attack value (binary) | Defense value (binary) |
|---|---|---|---|
| Game character 1 | 1100 | 1000 | 1010 |
| Game character 2 | 1100 | 1010 | 1000 |
| Game character 3 | 1100 | 1001 | 1101 |

In Table 1, the life values, attack values, and defense values are shown for game characters 1-3, respectively.

A certain player retrieves the game application from the server using an authorized mobile telephone. After first receiving an application retrieval request sent by the player, the server retrieves a key generation technique and an encryption technique built into the game application.

Assuming that the key generation technique is a key generation technique in the example above, the example encryption technique is as follows: a bitwise exclusive-or (XOR) operation is performed with respect to the encryption key and the data to be encrypted, and the data obtained after the XOR operation is used as the encrypted data corresponding to the data to be encrypted.

Then, based on a mobile telephone IMEI included in the application retrieval request sent by the player, the server computes, based on MD5, the 128-digit hash value for this IMEI. For example, assume the hash value is expressed in hexadecimal form as follows: 0xC8825DB10F2590EAAAD3B435B51404EE.

In some embodiments, the numerical values in each line of Table 1 can be concatenated to form a numerical series, and each series can be encrypted (hereinafter referred to as line by line encryption), in this situation, using an encryption key that has the same number of digits as the number of digits in the series allows for more convenient encryption of the series. Therefore, the number of digits of the adaptation key of the retrieved key generation technique can be the sum of the number of digits of any line in the data table (each line has three pieces of data, and each piece of data has four digits, thus the sum of the number of digits is 12). Thus, the encryption key generated based on the key generation technique is also 12 digits.

The computed hash value is used as the key seed. Because the number of digits of the hash value (128 digits) is greater than the number of digits of the adaptation key of the key generation technique (12 digits), starting with the highest digit in this key seed and moving toward the lowest digit, 12 digits can be successively selected, and the portion that is not selected can be truncated. Subsequently, the remaining selected 12 digits can be determined to be the generated encryption key used for line by line encryption. In this example, the line by line encryption key is expressed in hexadecimal form as: 0xC88, and expressed in binary form as 110010001000.

The encryption key is used to encrypt each line of Table 1 line by line, to obtain the encrypted numerical values of the three line series:

110010001000⊕110010001010=000000000010;
110010001000⊕110010101000=000000100000;
110010001000⊕110010011101=000000010101.

Table 2 below illustrates the data table after the line by line encryption of Table 1.

TABLE 2

|  | Life value (binary) | Attack value (binary) | Defense value (binary) |
|---|---|---|---|
| Game character 1 | 0000 | 0000 | 0010 |
| Game character 2 | 0000 | 0010 | 0000 |
| Game character 3 | 0000 | 0001 | 0101 |

Table 2 presents life values, attack values, and defense values of game characters 1-3, respectively, after line by line encryption.

The server sends the encrypted game application to an authorized mobile telephone. When running the encrypted game application, based on the authorized mobile telephone's IMEI, the authorized mobile telephone can decrypt the encrypted data using the key generation technique and the decryption technique built into the game application, and then operate the game application normally. But when an attacker attempts to operate the encrypted game application on an unauthorized mobile telephone, because the unauthorized mobile telephone is unable to generate a valid decryption key based on the unauthorized mobile telephone's IMEI using the key generation technique built into the game application, the unauthorized mobile telephone is therefore unable to decrypt the encrypted data. Because the above encrypted numerical values are different from the original numerical values, this difference will affect the computation results of the numerical system of the game application, thus the attacker will also be unable to operate the encrypted game application normally. The encrypted game application refers to the application including the encrypted data, Additionally, because the numerical values in the same column of the data table may be the same, (therefore, in this situation, if the data table is only encrypted line by line, it is still possible for the numerical values in the same column to be the same in the encrypted data table (as shown in Table 2, the numerical values in column 1 of Table 2 are all the same)), it is possible for an attacker to infer the encryption key and the encryption technique used to encrypt the data table, increasing the risk that the encryption key and the encryption technique could be deciphered. Therefore, in order to increase the strength of the encryption of the data table, in addition to line by line encryption of the data table, a second encryption of the encrypted data table can be performed (the second encryption can be, for example, column by column encryption by connecting the numerical values in each column of the data table end to end to form a series, and then encrypting each series). After the second encryption, the numerical values that were originally the same in this same column are not entirely the same. In some embodiments, the encryption key used during the second encryption can be generated by another key generation technique.

Continuing with the description of the second encryption (assuming the second encryption is column by column encryption), still using the computed hash value as the key seed, the server can successively select 12 digits, starting from the lowest digit of this key seed and moving toward to the highest digit, truncate the portion of the key seed that is not selected, and then determine the remaining selected 12 digits to be the generated encryption key to be used for the second encryption (in this example, another truncation method that is different from the truncation method used during the generation of the encryption key used for line by line encryption is used). This encryption key used for the second encryption can be expressed in hexadecimal form as 0x4EE, and expressed in binary form as 010011101110.

The second encryption of Table 2 is performed using the encryption key to obtain numerical values for three series after the second encryption is performed:
010011101110⊕000000000000=010011101110;
010011101110⊕000000100001=010011001111;
010011101110⊕001000000101=011011101011.

Table 3 below presents the data table after the second encryption of Table 2.

TABLE 3

|  | Life value (binary) | Attack value (binary) | Defense value (binary) |
| --- | --- | --- | --- |
| Game character 1 | 0100 | 0100 | 0110 |
| Game character 2 | 1110 | 1100 | 1110 |
| Game character 3 | 1110 | 1111 | 1011 |

Table 3 presents the life values, the attack values, and the defense values of game characters 1-3, respectively, after the second encryption is performed.

As can be seen, in Table 1, the life values of game characters 1-3 are the same; in Table 2, the life values of game characters 1-3 are still the same; and in Table 3, the life values of game characters 1-3 after the second encryption is performed are not entirely the same. Therefore, the second encryption can increase the level of difficulty for an attacker to decipher the encrypted data table, increasing the strength of the data table encryption.

Furthermore, after the terminal receives the encrypted application sent by the server, in the course of running the application, the application can generate data to be stored (such as historical data) or data to be returned to the server. In this situation, based on the terminal's identifying information, the terminal can generate an encryption key using the key generation technique built into the application, or the terminal can send a key retrieval request including the identifying information of the terminal to the server, and receive the encryption key from the server. Subsequently, the terminal can encrypt the data generated by the application based on the encryption key and the encryption technique built into the application. Finally, the encrypted data is then stored, or the encrypted data and the identifying information of the terminal are sent to the server. When the server receives the encrypted data and the identifying information of the terminal sent by the terminal, based on the received identifying information, the server can generate a decryption key using a preset key generation technique, and decrypt the encrypted data based on a decryption technique that corresponds to the encryption technique used by the terminal and the decryption key.

Figure 3:
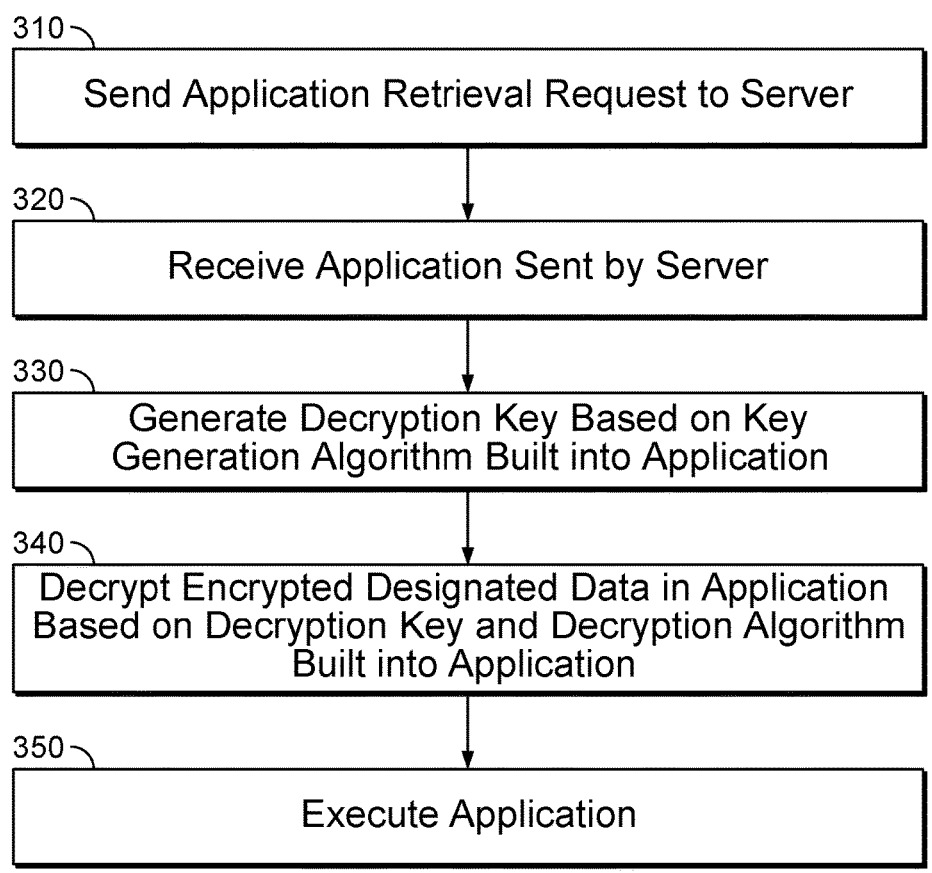
FIG. 3 is a flowchart illustrating another embodiment of a process for secure management of computer applications.

FIG. 3 is a flowchart illustrating another embodiment of a process for secure management of computer applications. In some embodiments, the process 300 is implemented by a terminal 820 of FIG. 8 and comprises:

In 310, the terminal sends an application retrieval request to a server, the application retrieval request including terminal identifying information.

In 320, the terminal receives an application returned by the server.

In some embodiments, designated data in the application has already been encrypted by the server.

In 330, based on the terminal identifying information, the terminal generates a decryption key based on a key generation technique built into the application.

In some embodiments, the key generation technique used to encrypt the designated data in the application and a decryption technique used to decrypt the encrypted designated data are built into the application. Based on the terminal's identifying information, the terminal generates a decryption key based on the key generation technique built into the application. The technique for generating the decryption key is the same as the technique used by the server to generate the encryption key, and will not be repeated here for conciseness.

In 340, the terminal decrypts the encrypted designated data in the application based on the decryption key and the decryption technique built into the application.

The terminal's decryption of the encrypted designated data in the application is a reverse process of the server's encryption of the designated data, and will not be repeated for conciseness.

In 350, the terminal executes the application using the decrypted designated data.

Based on process 300, an authorized terminal is able to generate the correct decryption key based on the authorized terminal's identifying information, and an unauthorized terminal will not be able to generate the correct decryption key based on the unauthorized terminal's identifying information, and will not be able to decrypt the encrypted designated data in the application, thus preventing attackers from running the application normally on unauthorized terminals.

Furthermore, in the course of executing the application, the terminal can generate data to be stored (such as historical data) or data to be returned to the server. To ensure security of the generated data, based on the terminal identifying information, the terminal can generate an encryption key based on the key generation technique built into the application, or the terminal can also send a key retrieval request including the identifying information of the terminal to the server, and receive an encryption key returned by the server. Then, the terminal can encrypt the generated data based on the encryption key and the encryption technique built into the application. Finally, the encrypted data is then stored, or the encrypted data and the identifying information of the terminal are sent to the server for processing.

Figure 4:
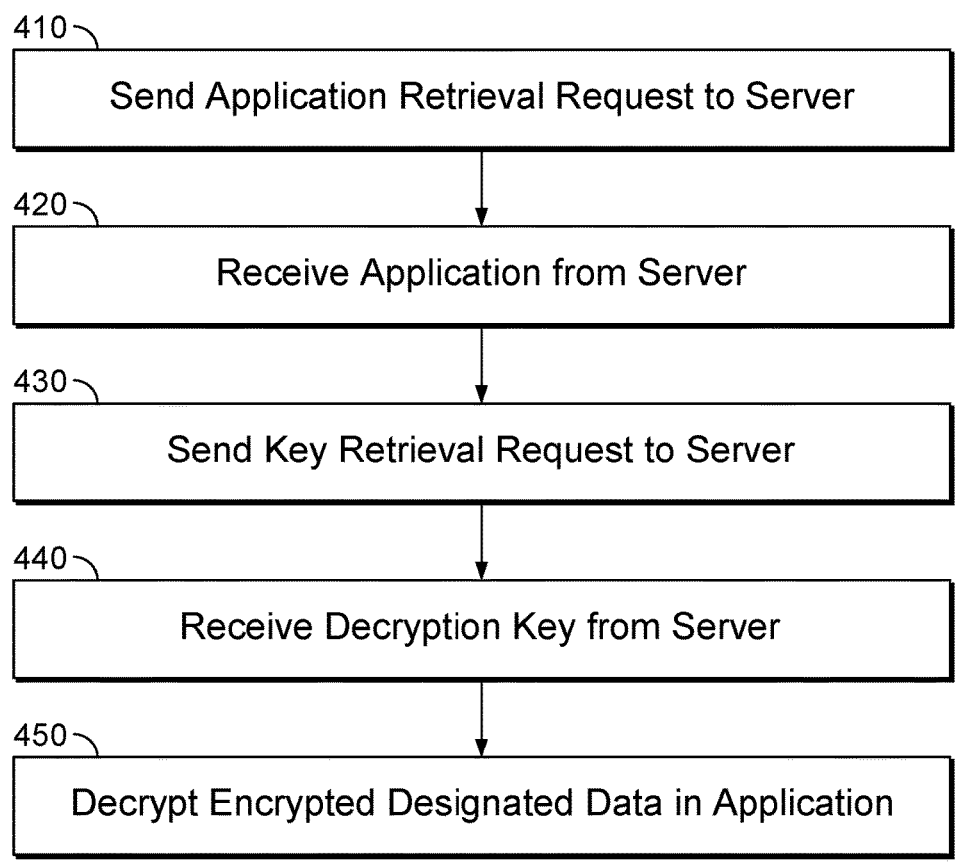
FIG. 4 is a flowchart illustrating yet another embodiment of a process for secure management of computer applications.

FIG. 4 is a flowchart illustrating yet another embodiment of a process for secure management of computer applications. In some embodiments, the process 400 is implemented by a terminal 820 of FIG. 8 and comprises:

In 410, the terminal sends an application retrieval request to a server, the application retrieval request including terminal identifying information.

In 420, the terminal receives an application from the server.

In 430, the terminal sends a key retrieval request to the server, the key retrieval request including terminal identifying information.

In 440, the terminal receives a decryption key from the server.

In some embodiments, the decryption key is generated by the server based on the terminal identifying information included in the key retrieval request and the preset key generation technique.

In 450, the terminal decrypts the encrypted designated data in the application based on the decryption key and the decryption technique built into the application.

Using process 400, only when the terminal identifying information included in the application retrieval request received by the server is the same as the terminal identifying information included in the key retrieval request can the server generate the correct decryption key based on the terminal identifying information included in the key retrieval request. Therefore, with respect to an encrypted application retrieved from the server by an authorized terminal, even if the encrypted application is copied to be executed on an unauthorized terminal, when the unauthorized terminal is to decrypt the application, the unauthorized terminal sends to the server the unauthorized terminal's identifying information, the unauthorized terminal's identifying information being included in the key retrieval request. Therefore, the server is also unable to generate the correct decryption key, and the unauthorized terminal is therefore also unable to decrypt the application, thus preventing attackers from operating the application normally on unauthorized terminals. Additionally, because the generating of the decryption key is implemented on the server, the possibility of the key generation technique being leaked to unauthorized parties is therefore reduced, further increasing security.

In some embodiments, to further enhance security, the key generation technique is not built into the application sent by the server to the terminal. When the terminal is to retrieve the decryption key, the terminal can send a key retrieval request including the terminal identifying information to the server. The server generates a decryption key based on the terminal identifying information and the preset key generation technique, and sends the decryption key to the terminal. Subsequently, the terminal decrypts the encrypted designated data in the application based on the decryption key and the decryption technique built into the application.

In some embodiments, instead of encrypting the designated data in the application, the first time the application is run on the terminal, based on the terminal's identifying information, the terminal can generate an encryption key based on the key generation technique built into the application, and encrypt the designated data in the application based on the encryption key and the encryption technique built into the application. When the designated data in the course of running the application is to be used, once again based on the terminal's identifying information, the terminal can use the key generation technique built into the application to generate a decryption key, and decrypt the encrypted designated data in the application based on the decryption key and the decryption technique built into the application, and thereby obtain the designated data. Thereafter, even if an attacker copies the application from one terminal to be run on another terminal, the generation of the correct decryption key based on the identifying information of the other terminal is extremely difficult. Therefore, decrypting the encrypted designated data in the application is extremely difficult, thus preventing attackers from operating the application normally on other terminals.

Figure 5:
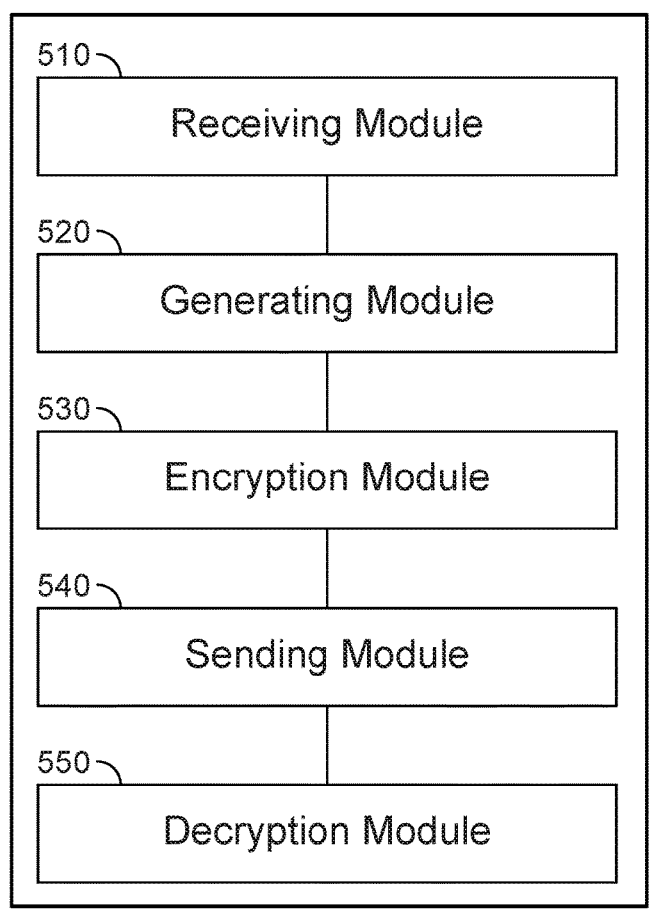
FIG. 5 is a structural schematic diagram of an embodiment of a device for secure management of computer applications.
Figure 6:
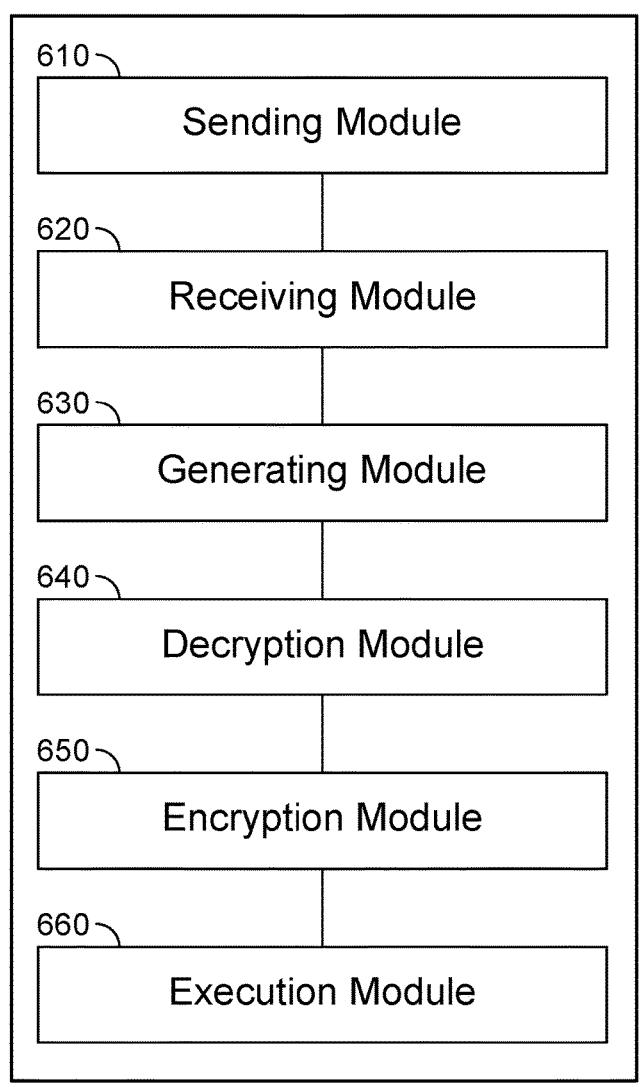
FIG. 6 is a structural schematic diagram of another embodiment of a device for secure management of computer applications.
Figure 7:
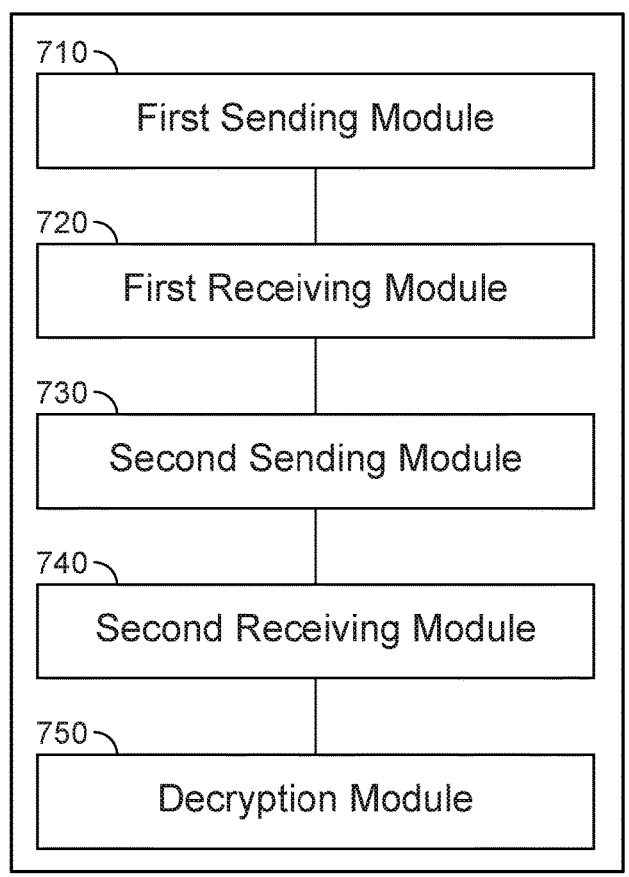
FIG. 7 is a structural schematic diagram of yet another embodiment of a device for secure management of computer applications.

The above process 100 of FIG. 1, process 300 of FIG. 3, and process 400 of FIG. 4 corresponds to device 500 of FIG. 5, device 600 of FIG. 6, and device 700 of FIG. 7, respectively.

FIG. 5 is a structural schematic diagram of an embodiment of a device for secure management of computer applications. In some embodiments, the device 500 is configured to implement process 100 of FIG. 1 and comprises: a receiving module 510, a generating module 520, an encryption module 530, a sending module 540, and a decryption module 550.

In some embodiments, the receiving module 510 is configured to receive an application retrieval request sent by a terminal, the application retrieval request including identifying information of the terminal.

In some embodiments, the generating module 520 is configured to generate, based on the identifying information included in the application retrieval request, an encryption key using a preset key generation technique.

In some embodiments, the encryption module 530 is configured to encrypt designated data in an application based on the encryption key and the preset encryption technique, to obtain an encrypted application.

In some embodiments, the sending module 540 is configured to send the encrypted application to the terminal.

In some embodiments, the generating module 520 is further configured to determine a hash value of the identifying information to serve as a key seed, and generate, based on the key seed, an encryption key using the preset key generation technique.

In some embodiments, the generating module 520 is further configured to determine whether a number of digits of the key seed is the same as a number of digits of an adaptation key of the key generation technique. In the event that the number of digits of the key seed is the same as the number of digits of the adaptation key, determine the key seed to be the generated encryption key. In the event that the number of digits of the key seed is not the same as the number of digits of the adaptation key, convert the key seed into a key seed having the same number of digits as the key adapter, and determine the converted key seed to be the generated encryption key.

In some embodiments, the designated data in the application comprises: a data table in a database of the application.

In some embodiments, the receiving module 510 is further configured to receive a key retrieval request sent by the terminal, the key retrieval request including the identifying information of the terminal.

In some embodiments, the generating module 520 is further configured to generate, based on the identifying information included in the key retrieval request, a decryption key based on a key generation technique.

In some embodiments, the sending module 540 is further configured to send the decryption key to the terminal.

In some embodiments, the decryption module 550 is configured to receive encrypted data and the identifying information of the terminal sent by the terminal, generate, based on the received identifying information, the decryption key based on the key generation technique, and decrypt the encrypted data using a decryption technique that corresponds to the encryption technique and the decryption key.

In some embodiments, the device 500 is located on the server.

FIG. 6 is a structural schematic diagram of another embodiment of a device for secure management of computer applications. In some embodiments, the device 600 is configured to implement process 300 of FIG. 3 and comprises: a sending module 610, a receiving module 620, a generating module 630, a decryption module 640, an encryption module 650, and an execution module 660.

In some embodiments, the sending module 610 is configured to send an application retrieval request to a server, the application retrieval request including terminal identifying information.

In some embodiments, the receiving module 620 is configured to receive an application sent by the server.

In some embodiments, the generating module 630 is configured to generate, based on the terminal identifying information, a decryption key using a key generation technique built into the application.

In some embodiments, the decryption module 640 is configured to decrypt encrypted designated data in the application based on the decryption key and a decryption technique built into the application.

The generating module 630 is further configured to determine a hash value of the terminal identifying information to serve as a key seed, and generate, based on the key seed, the decryption key based on the key generation technique built into the application.

The generating module 630 is further configured to determine whether a number of digits of the key seed is the same as a number of digits of an adaptation key of the key generation technique built into the application. If the number of digits of the key seed is the same as the number of digits of an adaptation key, determine the key seed to be the generated decryption key. If the number of digits of the key seed is not the same as the number of digits of an adaptation key, convert the key seed into a key seed having the same number of digits as the adaptation key, and determine the converted key seed to be the generated decryption key.

In some embodiments, the encryption module 650 is configured to generate, based on the terminal identifying information, an encryption key based on the encryption technique built into the application, or send a key retrieval request including the terminal identifying information to the server, receive the encryption key from the server, encrypt data generated by the application using the encryption key and the encryption technique built into the application, and store the encrypted data, or send the encrypted data and the terminal identifying information to the server.

In some embodiments, the execution module 660 is configured to execute the application using the decrypted designated data.

In some embodiments, the device 600 is located on a terminal.

FIG. 7 is a structural schematic diagram of yet another embodiment of a device for secure management of computer applications. In some embodiments, the device 700 is configured to implement process 400 of FIG. 4 and comprises: a first sending module 710, a first receiving module 720, a second sending module 730, a second receiving module 740, and a decryption module 750.

In some embodiments, the first sending module 710 is configured to send an application retrieval request including terminal identifying information to a server.

In some embodiments, the first receiving module 720 is configured to receive an application sent by the server.

In some embodiments, the second sending module 730 is configured to send a key retrieval request including the terminal identifying information to the server.

In some embodiments, the second receiving module 740 is configured to receive a decryption key returned by the server. In some embodiments, the decryption key is generated by the server based on the terminal identifying information included in the key retrieval request and a preset key generation technique.

In some embodiments, the decryption module 750 is configured to decrypt encrypted designated data in the application based on the decryption key and a decryption technique built into the application.

In some embodiments, the device 700 is located on the terminal.

Figure 8:
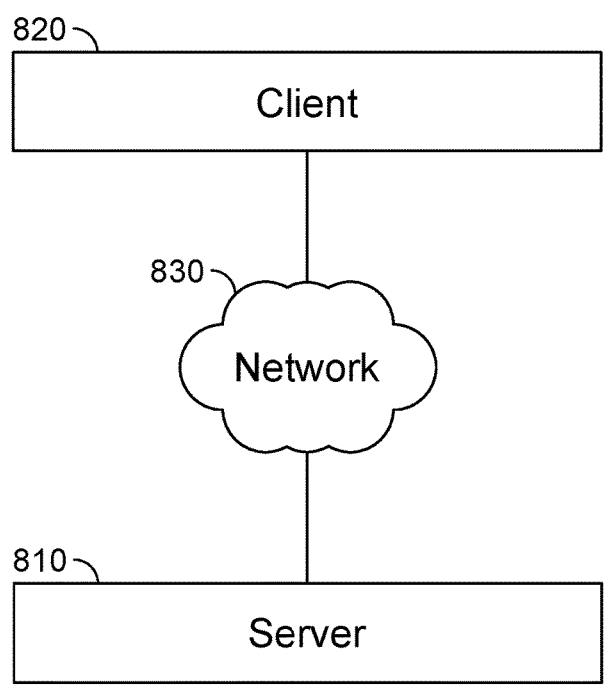
FIG. 8 is a diagram of an embodiment of a system for secure management of computer applications.

FIG. 8 is a diagram of an embodiment of a system for secure management of computer applications. In some embodiments, the system 800 includes a server 810 connected via a network 830 to a client or terminal 820. The client device can be a laptop computer, a desktop computer, a tablet, a mobile device, a smart phone, a wearable networking device, or any other appropriate computing device.

In some embodiments, the server is configured to receive an application retrieval request sent by the terminal 820, the application retrieval request including terminal identifying information, generate, based on a preset key generation technique, an encryption key based on the terminal identifying information included in the application retrieval request, encrypt, based on the encryption key and a preset encryption technique, designated data in an application, and send the encrypted application to the terminal 820.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 9:
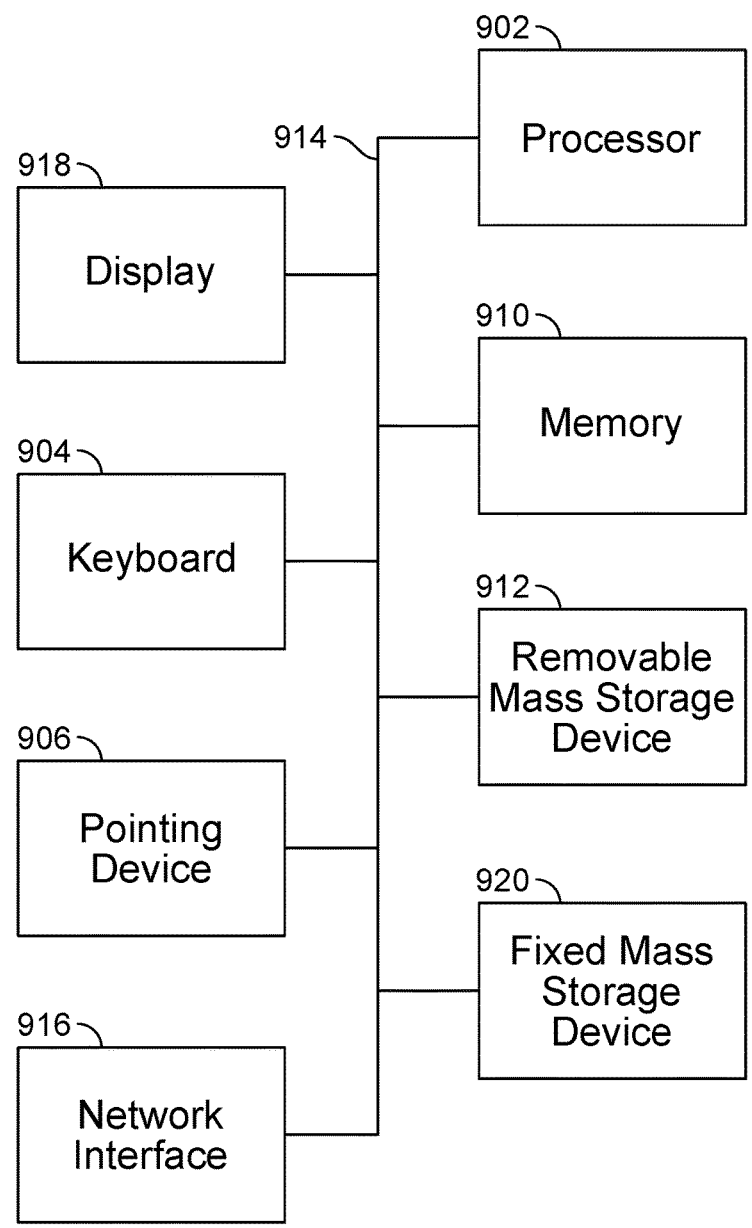
FIG. 9 is a functional diagram illustrating an embodiment of a programmed computer system for secure management of computer applications.

FIG. 9 is a functional diagram illustrating an embodiment of a programmed computer system for secure management of computer applications. As will be apparent, other computer system architectures and configurations can be used for secure management of computer applications. System 900 can be used to implement server 810 and/or client 820. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used for secure management of computer applications.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a server, an application retrieval request sent by a terminal, the application retrieval request including identifying information of the terminal, the application retrieval request requesting an application that uses an interpreted language;
generating, based on a preset key generation technique, an encryption key based on the identifying information included in the application retrieval request, wherein the generating of the encryption key is performed by the server;
encrypting, based on the encryption key and a preset encryption technique, designated data in the application to obtain an encrypted application, wherein the encrypting of the designated data is performed by the server, wherein the designated data comprises data that affects an accuracy of operating results of the application, or data that affects a system's operation; and
sending, by the server, the encrypted application to the terminal.

2. The method as described in claim 1, wherein:
the identifying information of the terminal is used to uniquely identify the terminal; or
the identifying information of the terminal is used to identify at least two terminals.

3. The method as described in claim 1, wherein the generating of the encryption key based on the identifying information included in the application retrieval request comprises:
determining a hash value of the identifying information to serve as a key seed; and
generating, based on the preset key generation technique, the encryption key based on the key seed.

4. The method as described in claim 3, wherein the generating of the encryption key based on the key seed comprises:
determining whether a number of digits of the key seed is the same as a number of digits of an adaptation key of the preset key generation technique;
in response to a determination that the number of digits of the key seed is the same as the number of digits of the adaptation key, setting the key seed to be the generated encryption key; and
in response to a determination that the number of digits of the key seed is not the same as the number of digits of the adaptation key:
converting the key seed into a key seed that has the same number of digits as the adaptation key; and
setting the converted key seed to be the generated encryption key.

5. The method as described in claim 1, wherein the designated data in the application comprises: a data table in a database of the application.

6. The method as described in claim 1, further comprising:
receiving a key retrieval request sent by the terminal, the key retrieval request including identifying information of the terminal;
generating, based on the identifying information included in the key retrieval request, a decryption key based on the preset key generation technique; and
sending the decryption key to the terminal.

7. The method as described in claim 1, further comprising:
receiving encrypted data and the identifying information of the terminal sent by the terminal;
generating, based on the received identifying information, a decryption key based on the preset key generation technique; and
decrypting the encrypted data based on a decryption technique corresponding to the preset encryption technique and the decryption key.

8. The method as described in claim 1, wherein the generating of the encryption key comprises:
determining whether a number of digits of a key seed is greater than a number of digits of an adaptation key of the preset key generation technique, the key seed corresponding to a hash value of the identifying information; and
in response to a determination that the number of digits of the key seed is greater than the number of digits of the adaptation key, converting the key seed to have the same number of digits as the adaptation key, wherein the converted key seed that has the same number of digits as the adaptation key serves as the encryption key.

9. The method as described in claim 1, wherein the interpreted language includes Java.

10. The method as described in claim 1, wherein the encrypting of the designated data in the application comprises:
performing, using the encryption key and the preset encryption technique, a first encryption on the designated data to obtain encrypted designated data, the first encryption including one of line by line encryption or column by column encryption; and
performing, using the encryption key and the preset encryption technique, a second encryption on the encrypted designated data to obtain the encrypted application, the second encryption including the other of the line by line encryption or the column by column encryption.

11. A method, comprising:
sending, by a client, an application retrieval request to a server, the application retrieval request including terminal identifying information, the application retrieval request requesting an application that uses an interpreted language;
receiving, by the client, the application sent by the server;
generating, based on the terminal identifying information, a decryption key based on a key generation technique built into the application, wherein the generating of the decryption key is performed by the client; and
decrypting, by the client, encrypted designated data in the application based on the decryption key and a decryption technique built into the application, wherein the designated data comprises data that affects an accuracy of operating results of the application, or data that affects a system's operation.

12. The method as described in claim 11, wherein the generating of the decryption key based on the key generation technique built into the application comprises:
determining a hash value of the terminal identifying information to serve as a key seed; and
generating, based on the key generation technique built into the application, the decryption key based on the key seed.

13. The method as described in claim 12, wherein the generating of the decryption key based on the key seed comprises:
determining whether a number of digits of the key seed is the same as a number of digits of an adaptation key of the key generation technique built into the application;

in response to a determination that the number of digits of the key seed is the same as the number of digits of the adaptation key, determining the key seed to be the generated decryption key; and in response to a determination that the number of digits of the key seed is not the same as the number of digits of the adaptation key:
converting the key seed into a key seed having the same number of digits as the adaptation key; and
determining the converted key seed to be the generated decryption key.

14. The method as described in claim 11, further comprising:
generating, based on the terminal identifying information, an encryption key based on the key generation technique built into the application, or sending a key retrieval request including the terminal identifying information to the server, and receiving an encryption key returned by the server;
encrypting the designated data generated by the application based on the encryption key and the preset encryption technique built into the application; and
storing the encrypted data, or sending the encrypted data and the terminal identifying information to the server.

15. A method, comprising:
sending, by a client, an application retrieval request to a server, the application retrieval request including terminal identifying information, the application retrieval request requesting an application that uses an interpreted language;
receiving, by the client, the application from the server;
sending, by the client, a key retrieval request to the server, the key retrieval request including the terminal identifying information;
receiving, by the client, a decryption key sent by the server, wherein the decryption key is generated by the server based on the terminal identifying information included in the key retrieval request and a preset key generation technique; and
decrypting, by the client, encrypted designated data in the application based on the decryption key and a decryption technique built into the application, wherein the designated data comprises data that affects an accuracy of operating results of the application, or data that affects a system's operation.

16. A device, comprising:
one or more processors configured to:
receive, by a server, an application retrieval request sent by a terminal, the application retrieval request including identifying information of the terminal, the application retrieval request requesting an application that uses an interpreted language;
generate, based on a preset key generation technique, an encryption key based on the identifying information included in the application retrieval request, wherein the generating of the encryption key is performed by the server;
encrypt, based on the encryption key and a preset encryption technique, designated data in the application to obtain an encrypted application, wherein the encrypting of the designated data is performed by the server, wherein the designated data comprises data that affects an accuracy of operating results of the application, or data that affects a system's operation; and
send, by the server, the encrypted application to the terminal; and a memory coupled to the one or more processors and configured to provide the one or more processors with instructions.

17. The device as described in claim 16, wherein:
the identifying information of the terminal is used to uniquely identify the terminal; or
the identifying information of the terminal is used to identify at least two terminals.

18. The device as described in claim 16, wherein the generating of the encryption key based on the identifying information included in the application retrieval request comprises to:
determine a hash value of the identifying information to serve as a key seed; and
generate, based on the preset key generation technique, the encryption key based on the key seed.

19. The device as described in claim 18, wherein the generating of the encryption key based on the key seed comprises to:
determine whether a number of digits of the key seed is the same as a number of digits of an adaptation key of the preset key generation technique;
in response to a determination that the number of digits of the key seed is the same as the number of digits of the adaptation key, set the key seed to be the generated encryption key; and
in response to a determination that the number of digits of the key seed is not the same as the number of digits of the adaptation key:
convert the key seed into a key seed that has the same number of digits as the adaptation key; and
set the converted key seed to be the generated encryption key.

20. The device as described in claim 16, wherein the designated data in the application comprises: a data table in a database of the application.

21. The device as described in claim 16, wherein the one or more processors are further configured to:
receive a key retrieval request sent by the terminal, the key retrieval request including identifying information of the terminal;
generate, based on the identifying information included in the key retrieval request, a decryption key based on the preset key generation technique; and
send the decryption key to the terminal.

22. The device as described in claim 16, wherein the one or more processors are further configured to:
receive encrypted data and the identifying information of the terminal sent by the terminal;
generate, based on the received identifying information, a decryption key based on the preset key generation technique; and
decrypt the encrypted data based on a decryption technique corresponding to the preset encryption technique and the decryption key.

23. A device, comprising:
one or more processors configured to:
send, by a client, an application retrieval request to a server, the application retrieval request including terminal identifying information, the application retrieval request requesting an application that uses an interpreted language;
receive, by the client, the application sent by the server;
generate, based on the terminal identifying information, a decryption key based on a key generation technique built into the application, wherein the generating of the decryption key is performed by the client; and decrypt, by the client, encrypted designated data in the application based on the decryption key and a decryption technique built into the application, wherein the designated data comprises data that affects an accuracy of operating results of the application, or data that affects a system's operation; and a memory coupled to the one or more processors and configured to provide the one or more processors with instructions.

24. The device as described in claim 23, wherein the generating of the decryption key based on the key generation technique built into the application comprises to:

determine a hash value of the terminal identifying information to serve as a key seed; and generate, based on the key generation technique built into the application, the decryption key based on the key seed.

25. The device as described in claim 24, wherein the generating of the decryption key based on the key seed comprises to:

determine whether a number of digits of the key seed is the same as a number of digits of an adaptation key of the key generation technique built into the application;

in response to a determination that the number of digits of the key seed is the same as the number of digits of the adaptation key, determine the key seed to be the generated decryption key; and in response to a determination that the number of digits of the key seed is not the same as the number of digits of the adaptation key:

convert the key seed into a key seed having the same number of digits as the adaptation key; and determine the converted key seed to be the generated decryption key.

26. The device as described in claim 23, wherein the one or more processors are further configured to:

generate, based on the terminal identifying information, an encryption key based on the key generation technique built into the application, or send a key retrieval request including the terminal identifying information to the server, and receive an encryption key returned by the server;

encrypt the designated data generated by the application based on the encryption key and an encryption technique built into the application; and store the encrypted data, or send the encrypted data and the terminal identifying information to the server.

27. A device, comprising:

one or more processors configured to:

send, by a client, an application retrieval request to a server, the application retrieval request including terminal identifying information, the application retrieval request requesting an application that uses an interpreted language;

receive, by the client, the application from the server;

send, by the client, a key retrieval request to the server, the key retrieval request including the terminal identifying information;

receive, by the client, a decryption key sent by the server, wherein the decryption key is generated by the server based on the terminal identifying information included in the key retrieval request and a preset key generation technique; and decrypt, by the client, encrypted designated data in the application based on the decryption key and a decryption technique built into the application, wherein the designated data comprises data that affects an accuracy of operating results of the application, or data that affects a system's operation; and a memory coupled to the one or more processors and configured to provide the one or more processors with instructions.

\* \* \* \* \*

UNITED STATES PATENT AND TRADEMARK OFFICE
CERTIFICATE OF CORRECTION

PATENT NO. : 10,284,372 B2
APPLICATION NO. : 14/863123
DATED : May 7, 2019
INVENTOR(S) : Jianwei Fan It is certified that error appears in the above-identified patent and that said Letters Patent is hereby corrected as shown below:

In the Specification

Column 3, Line 65, delete "application,to" and insert --application, to--, therefor.

Signed and Sealed this
First Day of October, 2019

Andrei Iancu
*Director of the United States Patent and Trademark Office*